J. B. BAXTER.
THIMBLE.
APPLICATION FILED DEC. 17, 1917.

1,276,011.

Patented Aug. 20, 1918.

Witnesses:
P. S. Taylor

Inventor:
John B. Baxter,
by Joss Milans
Atty.

UNITED STATES PATENT OFFICE.

JOHN B. BAXTER, OF TROY, NEW YORK, ASSIGNOR TO COVERT MANUFACTURING CO., OF TROY, NEW YORK, A CORPORATION OF NEW YORK.

THIMBLE.

1,276,011.  Specification of Letters Patent.  Patented Aug. 20, 1918.

Application filed December 17, 1917. Serial No. 207,530.

*To all whom it may concern:*

Be it known that I, JOHN B. BAXTER, a citizen of the United States, residing at Troy, in the county of Rensselaer and State of New York, have invented certain new and useful Improvements in Thimbles, of which the following is a specification, reference being had therein to the accompanying drawing.

This invention relates to improvements in thimbles intended particularly for use in connection with ropes or cables.

The invention has for its object the provision of a thimble with oppositely disposed diverging eyes having bearing portions associated with an intermediate binding or impaling screw, all coöperating to more effectually secure within the thimble a rope or cable passed therethrough.

With the foregoing structural characteristics in mind the invention may be said to embrace a thimble for a rope or cable in which the cable is bodily deflected or bent out of line and impinged from opposite directions at alternating points to effect at least a three point holding engagement between the thimble and the rope or cable.

The invention will be better understood from the accompanying drawings wherein the preferred embodiment thereof is illustrated, when considered in connection with the detailed description hereinafter contained.

In the drawings.

Referring more specifically to the drawings wherein like reference letters designate the same parts in the several views, A represents a rope or cable to which it is desired that the thimble be secured against slippage lengthwise of the cable.

Figure 1:
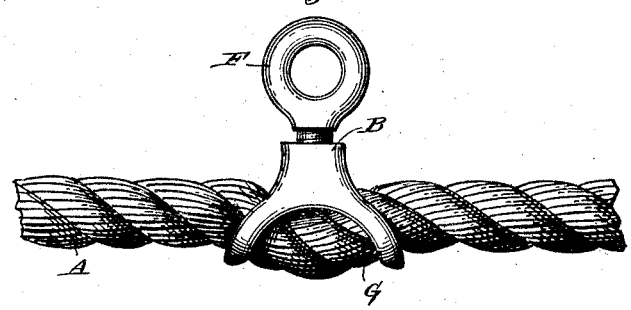
Figure 1 is a side elevation of the thimble operatively associated with a rope.
Figure 2:
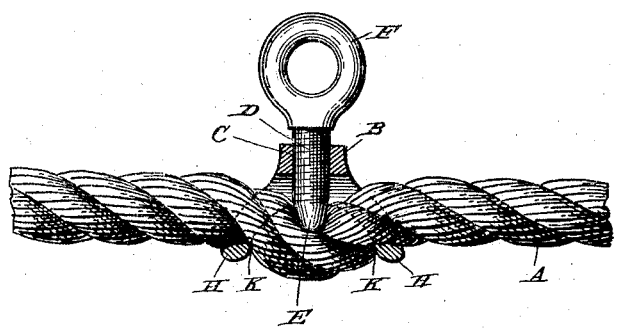
Fig. 2 is a longitudinal sectional view through the thimble.
Figure 3:
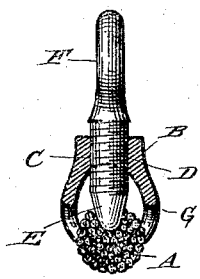
Fig. 3 is a transverse sectional view of the same.

B represents a disk-like yoke or neck portion of the thimble, the same being provided with a threaded centrally located aperture C, to receive and permit adjustment therein of a correspondingly threaded bolt D tapered or pointed at its inner end E, and having the customary loop or ring F at its outer end by which the bolt may be manipulated, and also through the medium of which other parts not necessary to be referred to herein may be attached.

Occupying a divergent relation to the yoke or neck B, are a pair of integral eyes, flaring apart to present relatively widely related bearings H reinforced and tied integrally together by arched portions of the metal J integral therewith and with the yoke or neck B.

The inner edge portions of the bearings H are furnished with sharp or reduced biting edges K facing in opposite directions toward the threaded bolt D.

With a full understanding of the description thus given, the action of the thimble when in clamped relation to the rope or cable will be clear. The eyes G are of such diameter as to accommodate varying sizes of ropes or cables, within reasonable limits, and upon passing a section of rope or cable through the eyes, the bolt D may be screwed home or into impaling or impinging relation to the central portion of the received part of the rope or cable which will result not only in pinning the latter in place so far as the bolt is concerned, but will bodily offset, displace or distort the received portion of the rope or cable out of line with its outwardly projecting ends or terminals to create the two additional biting and holding engagements between the sharp or reduced edges K of the bearing portions H of the eyes G, one at each end of the thimble, and at each side of the binding bolt or screw D. By this action it will be instantly appreciated that, in a simple inexpensive construction great efficiency is secured in obtaining a fixed or lasting coupling or union between the thimble and the rope or cable while in use but permitting rapid separation if desired.

Another advantage of the present construction as distinguished from old types of thimbles utilizing cylindrical perforated tubes or members, resides in the improved facility and simplicity of manufacture. Whereas, in the formation of said older style of thimble it was necessary that the services of both core-maker and molder were required, in the present instance, the improved thimble is produced by the molder without the necessity of providing a core in the molding process.

While I have disclosed one special embodiment of the invention it will be understood by workers in the art to which the invention relates, that said invention is capable of embodiment in other forms and devices that may be in keeping with the hereto appended claims.

Having thus described the invention, what I claim is:

1. A thimble of the character described comprising separated eyes occupying a divergent relation merged together at their upper sides to provide an elongated bottom opening extending a substantial distance upwardly of said sides, and the upper ends of the eyes merging into an interiorly threaded stem portion, in combination with a clamping bolt in said stem portion adapted to project at its end into the interior of the thimble at a point approximately centrally of said divergent eyes.

2. A thimble of the character described comprising separated eyes occupying a divergent relation, closed and merged together at their adjacent inner end portions to constitute a common supporting means for a clamping member, in combination with such clamping member adapted to project to the interior of the device at a point between the outer ends of said eyes, said outer ends having on their inner faces relatively sharp biting portions.

In testimony whereof I hereunto affix my signature in the presence of two witnesses.

JOHN B. BAXTER.

Witnesses:
JOSEPH H. MILANS,
HELEN BONHAM.

Copies of this patent may be obtained for five cents each, by addressing the "Commissioner of Patents, Washington, D. C."